(12) United States Patent
Nünnerich et al.

(10) Patent No.: US 11,092,208 B2
(45) Date of Patent: Aug. 17, 2021

(54) SPRING DEVICE AND SECURING DEVICE FOR SECURING A MACHINE ELEMENT, AND USE THEREOF

(71) Applicants: UHDE HIGH PRESSURE TECHNOLOGIES GMBH, Hagen (DE); thyssenkrupp AG, Essen (DE)

(72) Inventors: Peter Nünnerich, Siegen (DE); Wilfried Knauf, Herdecke (DE)

(73) Assignees: UHDE HIGH PRESSURE TECHNOLOGIES GMBH, Hagen (DE); THYSSENKRUPP AG, Essen (DE)

( * ) Notice: Subject to any disclaimer, the term of this patent is extended or adjusted under 35 U.S.C. 154(b) by 0 days.

(21) Appl. No.: 16/062,775

(22) PCT Filed: Feb. 8, 2017

(86) PCT No.: PCT/EP2017/052725
§ 371 (c)(1),
(2) Date: Jun. 15, 2018

(87) PCT Pub. No.: WO2017/137425
PCT Pub. Date: Aug. 17, 2017

(65) Prior Publication Data
US 2018/0363721 A1    Dec. 20, 2018

(30) Foreign Application Priority Data

Feb. 9, 2016    (DE) ..................... 10 2016 102 204.7

(51) Int. Cl.
*F16F 1/44*    (2006.01)
*F16F 3/093*   (2006.01)
*F16F 15/08*   (2006.01)

(52) U.S. Cl.
CPC .............. *F16F 1/445* (2013.01); *F16F 3/093* (2013.01); *F16F 15/08* (2013.01);
(Continued)

(58) Field of Classification Search
CPC .. F16F 1/445; F16F 3/093; F16F 15/08; F16F 2234/02; F16F 2236/045
See application file for complete search history.

(56) References Cited

U.S. PATENT DOCUMENTS

| | | | | |
|---|---|---|---|---|
| 1,857,168 A | * | 5/1932 | Steiner | F16F 1/445 |
| | | | | 267/140.5 |
| 2,157,408 A | * | 5/1939 | Greenberg | A47H 1/022 |
| | | | | 24/265 B |

(Continued)

FOREIGN PATENT DOCUMENTS

| | | |
|---|---|---|
| CN | 1906429 A | 1/2007 |
| DE | 1 958 660 U | 4/1967 |

(Continued)

OTHER PUBLICATIONS

English Translation of International Search Report issued in PCT/EP2017/052725, dated Apr. 20, 2017 (dated May 4, 2017).

*Primary Examiner* — Robert A. Siconolfi
*Assistant Examiner* — James K Hsiao
(74) *Attorney, Agent, or Firm* — thyssenkrupp North America, LLC (57) ABSTRACT

The present disclosure concerns a spring device with a piston and a housing into which the piston can be introduced in a movement direction. A cavity is formed between the piston and the housing, in which cavity a compressible solid body spring is arranged that consists of a solid body that can be compressed by the piston. At least one surface of the piston that faces the solid body spring is conical or concave. The disclosure furthermore concerns a securing device com- (Continued)

prising such a spring device and the use thereof, in particular for a container closing plug.

20 Claims, 4 Drawing Sheets (52) U.S. Cl.
CPC ..... *F16F 2224/025* (2013.01); *F16F 2234/02* (2013.01); *F16F 2236/045* (2013.01)

(56) References Cited

U.S. PATENT DOCUMENTS

| | | | | |
|---|---|---|---|---|
| 2,179,959 A * | 11/1939 | Rolfschroedter | ....... | F16F 1/545 403/224 |
| 2,263,599 A | 11/1941 | Tucker | | |
| 2,668,049 A * | 2/1954 | Taylor | .................... | F16F 1/445 267/153 |
| 2,681,800 A * | 6/1954 | Taylor | .................... | F16F 1/445 267/292 |
| 2,702,451 A * | 2/1955 | Schwaibold | ....... | G04B 37/1486 59/80 |
| 3,030,099 A * | 4/1962 | Piatscheck | ............ | F16F 1/3732 267/3 |
| 3,039,757 A | 6/1962 | Barr | | |
| 3,179,426 A * | 4/1965 | Duer | ........................ | F16J 15/20 277/529 |
| 3,376,031 A * | 4/1968 | Lee | ......................... | F16F 1/445 267/136 |
| 3,434,708 A | 3/1969 | Hawk, Jr. | | |
| 3,480,268 A | 11/1969 | Fishbaugh | | |
| 3,710,458 A * | 1/1973 | Bornor | .................... | F16F 1/445 24/265 B |
| 4,005,507 A * | 2/1977 | Yamazaki | .............. | B43M 15/00 24/351 |
| 4,138,171 A * | 2/1979 | Kunkel | ................. | F16D 23/147 192/11 OB |
| 4,591,030 A * | 5/1986 | Antkowiak | ............. | F16F 1/373 188/268 |
| 4,603,363 A * | 7/1986 | Rickert | ................... | F16F 1/426 188/379 |
| 4,726,631 A | 2/1988 | Jones | | |
| 5,135,329 A * | 8/1992 | Yuda | ....................... | F16F 15/08 403/226 |
| 5,366,200 A * | 11/1994 | Scura | ........................ | F16F 7/00 248/632 |
| 5,375,823 A * | 12/1994 | Navas | ................ | A61B 17/7005 623/17.15 |
| 5,460,357 A * | 10/1995 | Stewart | .................. | B62K 25/04 267/141.1 |
| 5,529,327 A * | 6/1996 | Huang | ................... | B62K 25/08 267/141.1 |
| 5,540,419 A | 7/1996 | Kurr | | |
| 5,542,508 A * | 8/1996 | Van Erden | ................ | E05F 5/00 188/130 |
| 6,202,995 B1 * | 3/2001 | Jou | .......................... | B60G 7/04 267/140 |
| 7,484,719 B2 | 2/2009 | Gedenk | | |
| 7,770,905 B2 * | 8/2010 | Dotsey | ................ | B60B 33/0002 16/18 R |
| 9,771,030 B1 * | 9/2017 | DeHaai | ................ | B60R 11/0264 |
| 2003/0037587 A1 * | 2/2003 | Lowery | ................ | B21D 1/06 72/705 |
| 2005/0138787 A1 * | 6/2005 | Katoh | .................... | B21K 23/04 29/451 |
| 2006/0255516 A1 * | 11/2006 | Dickson | .................. | F16F 3/093 267/141.1 |
| 2009/0179397 A1 * | 7/2009 | Lorenzon | ............... | B60G 11/52 280/124.106 |
| 2010/0109215 A1 * | 5/2010 | Ruthinowski | ........ | B60N 2/2887 267/140.13 |
| 2016/0138673 A1 * | 5/2016 | Hattori | ............... | B62D 33/0604 248/634 |

FOREIGN PATENT DOCUMENTS

| | | |
|---|---|---|
| DE | 1992297 U | 8/1968 |
| DE | 16 75 012 A | 9/1970 |
| DE | 1759755 A | 7/1971 |
| DE | 2 342 370 A | 2/1974 |
| DE | 74 39 698 U | 5/1975 |
| DE | 29 23 290 A | 12/1979 |
| DE | 196 40 167 A | 4/1998 |
| DE | 10 2004 059049 A | 6/2006 |
| EP | 0 587 987 A | 3/1994 |
| EP | 0 670 435 B | 4/1997 |
| GB | 494 851 A | 11/1938 |

* cited by examiner

SPRING DEVICE AND SECURING DEVICE FOR SECURING A MACHINE ELEMENT, AND USE THEREOF

CROSS REFERENCE TO RELATED APPLICATIONS

This application is a U.S. National Stage Entry of International Patent Application Serial Number PCT/EP2017/052725, filed Feb. 8, 2017, which claims priority to German Patent Application No. DE 10 2016 102 204.7, filed Feb. 9, 2016, the entire contents of both of which are incorporated herein by reference.

FIELD

The present disclosure generally relates to a spring device with a piston and a housing into which the piston can be introduced in a movement direction, and a securing device for securing a machine element.

BACKGROUND

DE 1 958 660 U describes a spring device with a hollow cylindrical housing and a piston arranged movably in the housing. A cylindrical cavity exists between the piston and the housing and is filled with a damping medium comprising a foam. The foam has bubbles which are filled with a gas. On a movement of the piston reducing the cavity, the gas-filled bubbles are compressed, and thus the movement of the piston is elastically sprung and damped.

In such spring devices, volume changes of the cavity may be made by compressing the gas contained in the bubbles. The disadvantage is that the maximum pressure which the spring device can absorb is limited by the bulk modulus of the gas used, which at atmospheric pressure is typically less than 1 MPa. Such foams cannot therefore be used for springing and/or damping particularly high pressures, which would result from high forces, in spring devices with compact design.

Further spring devices are described in the following publications: U.S. Pat. No. 2,263,599 A, DE 17 59 755 A, DE 16 75 012, DE 2 342 370 C2, U.S. Pat. No. 3,434,708 A, DE 74 39 698 U, U.S. Pat. No. 3,039,757 A, U.S. Pat. No. 3,376,031 A.

Thus a need exists to allow elastic springing of high forces in a compact design.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention concerns a spring device with a piston and a housing into which the piston can be introduced in a movement direction, wherein a cavity is formed between the piston and the housing. The invention furthermore concerns a securing device for securing a machine element, and the use of the spring device in connection with securing machine elements.

Such spring devices are used for example for vibration-damped mounting of machines.

In some examples, a spring device is proposed with a piston and a housing into which the piston can be introduced in a movement direction, wherein a cavity is formed between the piston and the housing, wherein a compressible solid body spring element is arranged in the cavity and consists of a solid material that can be compressed by the piston.

At least one surface of the piston which faces the solid body spring element is formed conical or concave. This allows the force component acting on compression to be oriented inwardly, in particular at least approximately towards a center point of the solid body spring element. Thus at least one surface of the piston facing the solid body spring element may be formed conical or concave, such that a force component acting thereon under compression also causes a spreading of the piston. This gives a particularly advantageous pressure distribution both in the solid body spring element and on the piston or interface to the housing.

With the spring device according to the invention, when the cavity is reduced by the piston penetrating into the housing, the solid material of the solid body spring element is compressed. The solid compressible material, in comparison with gases, has a higher bulk modulus so that for the same cavity reduction, a larger force can be absorbed. Also, with a solid body spring element, only very slight temperature increases occur in comparison with gases. Also, the spring compression in gases is significantly more pronounced. With the spring device according to the invention, therefore, it is possible to absorb high forces without it being necessary to enlarge the size of the spring device, in particular the cavity between the housing and the piston.

Preferably, the solid body spring element is configured as a full material, solid body spring element. This means that the solid body spring element has no recesses, inclusions or pores. The solid body spring element is preferably not foamed, or is formed without fluid-filled cavities.

The solid body spring element may be made of several segments, in particular segments not aligned to each other, e.g. in an arrangement with one end face of one segment acting laterally on a casing surface of the other segment. The springing may take place here in several dimensions, with several directions of action or several points of attack or force vectors along differently aligned axes. The individual segments may each have a specific bulk modulus.

In a preferred embodiment, the solid body spring element fills the cavity between the piston and the housing substantially completely, preferably completely. It may be useful in particular for installation if a minimal gap is present. Complete filling therefore may also mean complete filling at least under operating load. Complete filling entails mutual contact of the respective surfaces. Expansion or displacement of the solid body spring element inside the cavity is then not possible, so that the compressibility of the material of the solid body spring element is primarily, and preferably exclusively, decisive for the spring properties. Compression then takes place with minimum volume changes. Any free volume which may perhaps still be present (in unloaded state) is significantly smaller than a stroke or stroke volume of the piston.

The housing of the spring device may be made of one piece or multipiece. Preferably, the housing and the piston are not sealed gas-tightly from each other, so that a simple construction is possible.

According to a preferred embodiment, the solid body spring element is made of a plastic. Particularly preferably, the plastic is a thermoplastic. Alternatively the plastic may be an elastomer.

It has proved advantageous if the solid body spring element has a bulk modulus in the range from 100 MPa to 100,000 MPa, preferably from 1,000 MPa to 6,000 MPa. Preferably, the modulus of elasticity of the housing and/or the piston is at least three times greater, preferably 10 to 100 times greater than the bulk modulus of the solid body spring element. For example, the housing and/or the piston may be made of metal, in particular steel, aluminum or non-ferrous metal.

An embodiment is particularly preferred in which the solid body spring element is made of polyethylene. Thus the spring device may be produced economically. Particularly preferably, the solid body spring element is made of ultra-high molecular polyethylene (PE-UHMW). Alternatively, the solid body spring element may be made of polyamide.

In an advantageous embodiment, the solid body spring element is assembled from at least two coated segments, each with a different bulk modulus. In this way, the stiffness and/or progression behavior of the spring device may be set particularly precisely. For example, the segments may be arranged successively in the movement direction of the piston.

According to one exemplary embodiment, the solid body spring element is formed from at least two segments which are arranged contacting each other in different action directions, each in one of several cavities of the housing, in particular an end face of the one segment on a lateral casing surface of an/the other segment. This gives a high flexibility both for the force directions to be damped, and with regard to factorizing of forces (volume translator).

As stated, it is advantageous if at least one surface of the piston facing the solid body spring element is formed conical or concave. On a movement reducing the cavity, the quasi-static pressure then prevailing in the solid body spring element causes a force component which leads to a spreading of the piston and hence reduces a gap between the piston and the housing, or leads to the contact of the piston on the housing inner face. The risk of extrusion of material of the solid body spring element is reduced, which also extends the service life of the spring device. This effect may also be described as a cavity seal which self-improves as the load increases.

The object cited initially is furthermore achieved with a securing device for securing a machine element with a spring device as described above. Thus in an elegant fashion, several functions may be fulfilled together with a very compact component. In particular, the above-mentioned advantages then apply.

In an advantageous embodiment, the piston and/or the solid body spring element has a circular cross-section. This gives a particularly compact, robust and simple design which can be integrated well in small cavities.

Alternatively, an embodiment is preferred in which the piston and/or the solid body spring element has an annular cross-section. This has the advantage that a connecting device may be arranged in a hole in the ring form, for example a screw or a rivet. In this context, it has proved particularly advantageous if the piston and/or the solid body spring element is arranged concentrically about a cylindrical passage hole in which a screw can be received. The securing device preferably has a screw received in the passage hole. To this extent, the spring device may be used as a retention element for a screw connection.

According to one exemplary embodiment, the piston lies or is brought to rest on the inside on the housing, in particular over the full circumference. This gives a high robustness and precisely defined damping properties.

According to one exemplary embodiment, the piston together with the housing forms an inner delimitation or inner casing surface of the cavity, which cavity is at least compressible by the piston. This gives a compact, stable arrangement for high pressure loads.

According to one exemplary embodiment, all surfaces of the piston facing the solid body spring element are formed conical or concave, corresponding to a corresponding convex form of the solid body spring element lying against the piston. This allows an advantageous embedding of the solid body spring element, in particular with regard to pressure distribution.

According to one exemplary embodiment, corners formed between the housing and the piston are greater than 90°, in particular greater than 125°. This further promotes embedding.

According to one exemplary embodiment, the cavity is surrounded by concave or flat surface portions which transform into each other constantly or with an angle which is greater than 90°, in particular greater than 125°. This gives good compression behavior even under high pressures and forces, without greatly stressing the solid body spring element.

According to one exemplary embodiment, on both sides, the piston is arranged on two end faces of the housing. This also has advantages with regard to symmetry and actuation or force action on the solid body spring element.

According to one exemplary embodiment, on one or both sides, the piston has a contact or pressure face for receiving and transmitting the (compression) forces to be transmitted to the solid body spring element. This gives a simple, robust arrangement or structure, even with small dimensions and also in relation to large forces. A symmetry can also be achieved easily. In particular, a series connection or series arrangement of machine element, housing, solid body spring element and piston, or of machine element, piston, solid body spring element and further piston, can be achieved.

According to one exemplary embodiment, the piston in unloaded state overlaps the housing on at least one side and protrudes therefrom, in particular in relation to an end face of the housing. Thus the piston may lie on a cover plate. The amount of overlap may correspond to a distance between the cover plate and the housing.

According to one exemplary embodiment, the solid body spring element has at least one conically convex end, and/or the solid body spring element is formed cylindrical and doubly conically convex on opposite sides. This not least also gives advantages with regard to pressure distribution. The cavity may have a corresponding geometry. The spring device may be configured to vary the cavity volume in the region of a/the cylindrical portion of the cavity or solid body spring element. This gives a homogenous load distribution, largely independently of the compression degree.

According to one exemplary embodiment, the housing has a shoulder or step, in particular in a configuration as a stepped bore, on which shoulder or step the solid body spring element rests or may be brought to rest. This allows the cross-section of the cavity to be enlarged in the ratio of piston to cross-section, in order to reduce the stiffness of the arrangement in the manner of a volume translator. Optionally, the cross-section of the cavity may also be reduced in the ratio of piston to cross-section, in order to increase the stiffness. The solid body spring element may therefore be configured such that different volume forms can be combined with each other, so that adaptations in relation to installation space and spring stiffness can easily be made, as well as other possibilities e.g. changing the polymer material.

According to one exemplary embodiment, the spring device is configured for a volume translation, in particular by means of a shoulder or step provided in the housing and/or by means of several segments of the solid body spring element which are arranged unaligned with but acting on each other. A volume translation can thus be achieved not only by a step or shoulder in the housing, but also by an arrangement of the solid body spring element (or several segments of the solid body spring element) in several cavities which are interconnected but independently pressurizable, for example two cylindrical cavities arranged orthogonally to each other. Also, a combination of both measures is possible depending on application and the development of the force vectors, or depending on arrangement of the objects to be damped. One of the segments or cavities may then e.g. be dimensioned significantly smaller than the other segment or cavity, and may act in the manner of a small ram on the larger segment (volume translation or factorizing of a springing effect).

Alternatively or additionally to the embodiments described above, the advantageous features cited in connection with the spring device may also be applied to the securing device.

The object outlined above is also achieved by a spring device for mounting a machine element, in particular a spring device as claimed in any of the preceding claims, produced by introduction of a piston into a housing and formation of a cavity in between, in which a compressible solid body spring element is arranged, wherein at least one conical or concave surface of the piston facing the solid body spring element is mounted in the cavity such that on compression, force components acting thereon are oriented inwardly, and/or such that a force component acting thereon under compression causes a spreading of the piston.

The object outlined above is also achieved by a use of a spring device described above as a pretensioning element for a securing device in the manner of a screw connection, or a use of a spring device as described above on or at the site of or instead of a container closure plug, in particular as a replacement for a solid closure plug. It has been shown that the solid body spring element described herein is suitable in particular, because of the compact design, for configuration of assemblies in installation spaces which would otherwise be subjected to extreme forces caused by deformation. The solid body spring element may very advantageously compensate for loads, in particular such that even a load relief may be achieved, e.g. with a sealing system with comparatively sensitive sealing lense with surface contour specifically designed for sealing. In particular, it can be ensured that the surface pressure on the sealing lense remains constant over the entire (operating) pressure range. For this, the solid body spring element or the entire arrangement may also be set up specifically with regard to optimum stiffness.

Further details, features and advantages of the invention arise from the drawings and from the description below of preferred embodiments with reference to the drawings. The drawings illustrate merely exemplary embodiments of the invention which do not restrict the inventive concept. With regard to reference signs not described explicitly in one of the figures, reference is made to the further figures.

In the various figures, the same parts always carry the same reference signs and therefore usually are only mentioned or described once.

Figure 1:
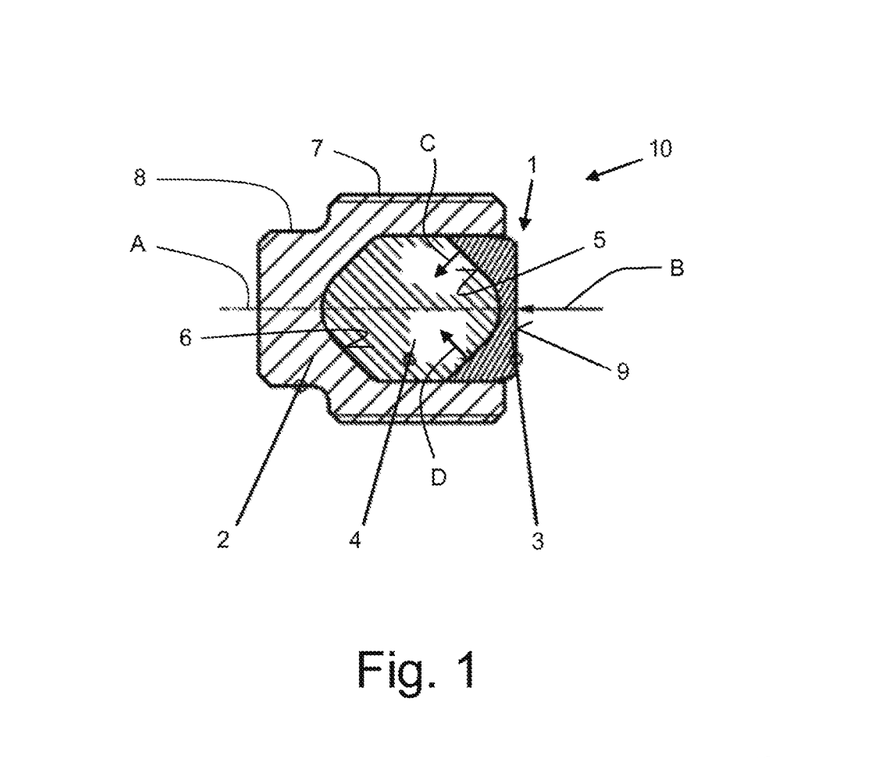
FIG. 1 is a sectional view of a first exemplary embodiment of a securing device with a spring device.
Figure 2:
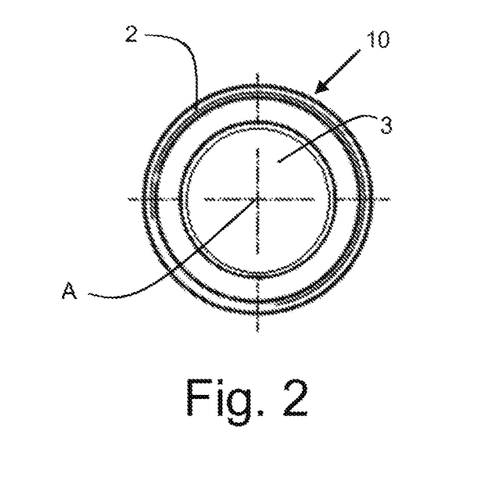
FIG. 2 is a side view of the securing device in FIG. 1 in the movement direction of the piston.
Figure 3:
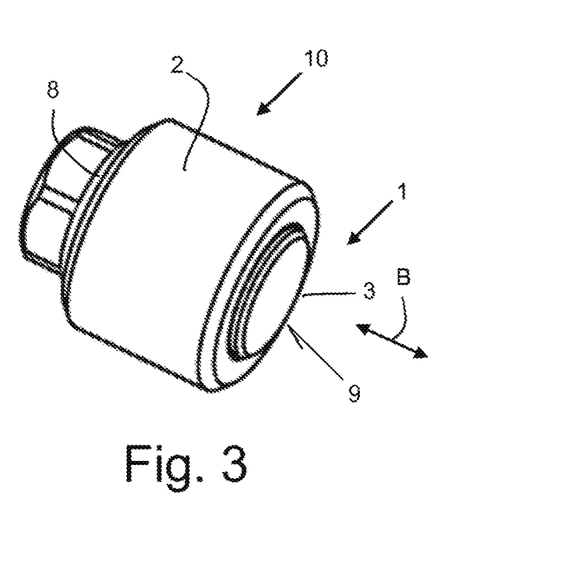
FIG. 3 is a perspective side view of the securing device in FIG. 1 in the movement direction of the piston.

FIGS. 1 to 3 show a first exemplary embodiment of a securing device 10 according to the invention for securing a machine element, with a spring device 1. The securing device 10 is formed as a spring-damped retaining bolt, via which a movable, in particular oscillatable machine part can be mounted.

The securing device 10 has a substantially cylindrical form and has an external thread 7, via which the securing device 10 may be attached to a first machine part. A multi-edged profile 8, formed for example as a hexagon on which a tool can be placed, is provided on a first end face of the securing device 10. On the opposite end face, the securing device 10 has a pressure face 9 on which a second machine part may be mounted. Alternatively, the second machine part may be connected to the piston 3, in particular by substance-bonding. The housing 2 and piston 3 may also be formed differently in relation to their connection, in particular may also be an integral part of machine parts to be damped against each other.

The spring device 1 has a housing 2 which is made of one piece in the first exemplary embodiment and forms a base body of the securing device 10. A cylindrical piston 3 is mounted inside the housing 2 so as to be movable in a movement direction B which runs parallel to a longitudinal axis A of the spring device 1. To this extent, the piston 3 has a circular cross-section. Both the housing 2 and piston 3 are made of metal, in particular steel. In the region between the piston 3 and the inner contour of the housing 2 lies a cavity which is completely filled with a solid body spring element 4. The solid body spring element 4 is compressible, so the solid body spring element 4 constitutes a compression spring.

The solid body spring element 4 is made of polymer thermoplastic. Preferably, polyethylene is used for this. The solid body spring element 4 is configured cylindrical with circular cross-section. The solid body spring element 4 is formed as a one-piece, full material, solid body spring element 4 which has no inclusions, recesses or pores. In a derivative, the solid body spring element 4 may be segmented such that it comprises several segments with different bulk moduli, whereby a spring device 1 with a progressive spring curve may be obtained.

In order to reduce or prevent undesirable removal or extrusion of material from the solid body spring element 4 on repeated insertion and retraction of the piston 3, it is advantageous if a surface 5 of the piston 3 facing the solid body spring element 4 is configured conical or concave. On a cavity-reducing movement, the quasi-static pressure prevailing in the solid body spring element 4 causes a force component C and D which leads to spreading of the piston, and hence reduces a gap between the piston 3 and housing 2 or leads to the piston 3 resting on the housing inner face.

The inner surface 6 of the housing lying opposite the surface 5 of the piston 3 described above may, for reasons of symmetry and the associated advantages relating to installation, also be formed correspondingly to the surface 5.

Figure 4:
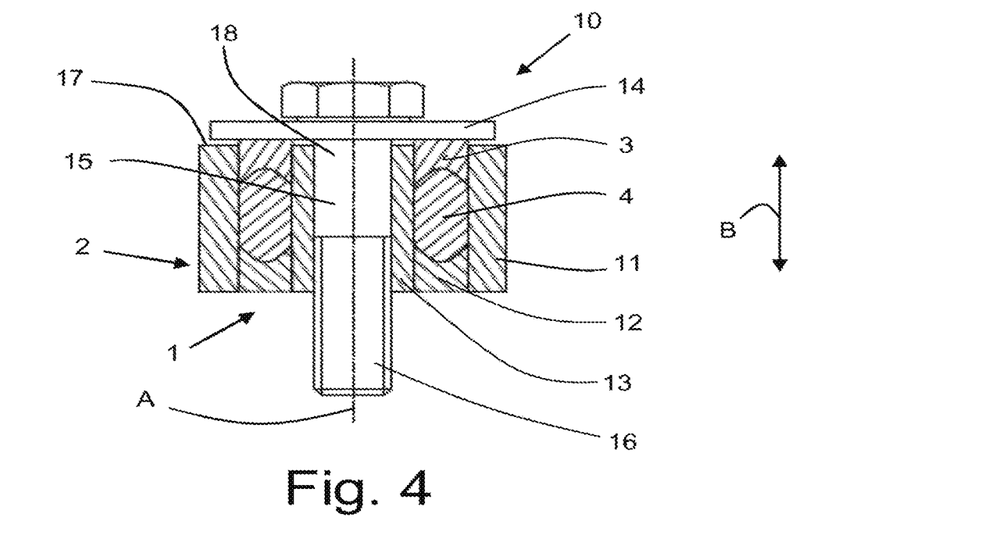
FIG. 4 is a sectional view in a second exemplary embodiment of a securing device with a spring device.
Figure 5:
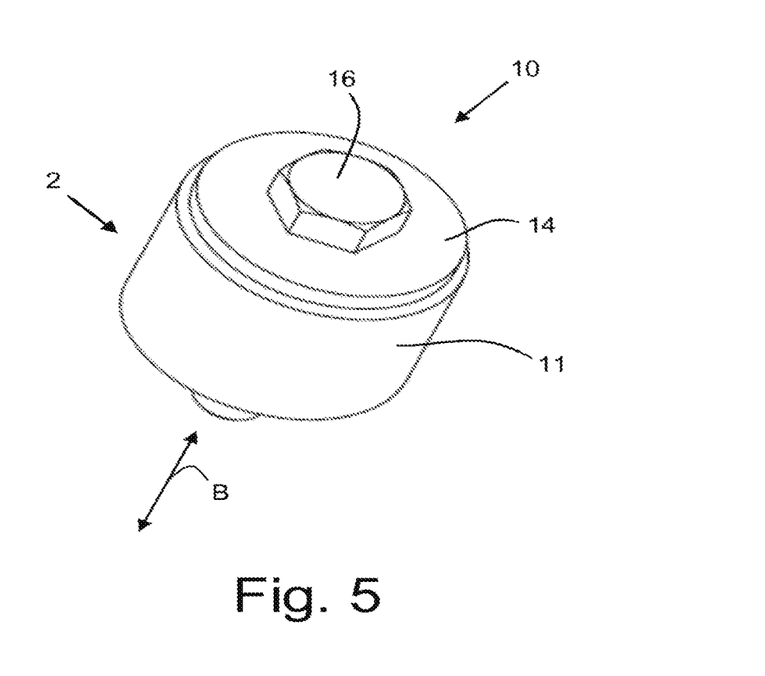
FIG. 5 is a perspective view of the securing device of FIG. 4.

FIGS. 4 and 5 show a second exemplary embodiment of a securing device 10, by means of which a vibration-damping mounting of machine parts may be achieved. The securing device 10 has a spring device 1 with a housing 2 constructed as a ring. The housing 2 has a cylindrical outer wall 11 and a cylindrical inner wall 13, which are connected together via an annular base 12. The outer wall 11 and inner wall 13 are arranged concentrically about a longitudinal axis A. Thus the housing 2 is a multipiece housing 2. In the region of the longitudinal axis A, the housing 2 has a passage hole 15 in which a screw 16 may be introduced.

Furthermore, the spring device 1 has an annular piston 3 which, together with the housing 2, delimits an annular cavity, and which is mounted in the housing 2 so as to be movable in a movement direction B parallel to the longitudinal axis A. Piston 3 and housing 2 are made of metal, for example steel. The annular cavity is completely filled with a compressible, annular, solid body spring element 4. The solid body spring element 4 is made of polymer, preferably polyethylene.

In order to reduce or prevent undesirable removal or extrusion of material from the solid body spring element 4 on repeated insertion and retraction of the piston 3, it is advantageous if a surface 5 of the piston 3 and/or the base 12 facing the solid body spring element 4 is configured conical or concave. On a cavity-reducing movement, the quasi-static pressure prevailing in the solid body spring element 4 causes a force component which leads to spreading of the piston 3, and hence reduces the gap between the piston 3 and housing 2 or leads to the piston 3 and 12 resting on the housing inner face.

A cover plate 14 is attached to the side of the annular piston 3 lying opposite the solid body spring element 4. The cover plate 14 has a recess for passage of the screw 16 which is arranged aligned with the passage hole 15 of the housing 2. A second machine part may be connected to the housing 2. For this, an external thread may be provided on the outside of the housing 2, in particular on the outer wall 11.

The cover plate 14 is arranged such that, in an unloaded state of the spring device 1, it has a distance from the housing 2. Under heavy load on the spring device 1, the cover plate 14 hits against an end face 17 of the housing 2, whereby excessive loading of the solid body spring element 4 can be prevented.

The securing devices 10 described above for securing machine elements each have a spring device 1 with a piston 3 and housing 2, into which the piston 3 may be introduced in a movement direction B. A cavity is formed between the piston 3 and the housing 2, and contains a compressible solid body spring element 4 consisting of a solid body which can be compressed by the piston 3.

According to a derivative of the exemplary embodiment shown in FIGS. 4 and 5, the piston 3 is connected to the outer wall 11, and the base 12 is connected to the inner wall 13, so that the housing is formed by the base 12 and inner wall 13.

A further derivative provides that the piston 3 is connected to the inner wall 13, and the base 12 is connected to the outer wall 11. Thus the housing comprises the base 12 and the outer wall 11.

According to a further derivative, the element designated with reference sign 12 is movable in relation to the inner wall 13 and outer wall 11, so that this forms a piston in the sense of the invention. In such an embodiment, the element designated with reference sign 3 fulfils the function of the base. The housing is thus formed by the elements 11, 12 and 3.

At present, applications for the present invention are covered with cup springs, ondular washers and other forms of metallic spiral springs. In comparison, for the same force and deformation data, the present invention requires less installation space.

In contrast to fluid-filled spring elements, the spring device according to the invention requires no further sealing elements.

Figure 6:
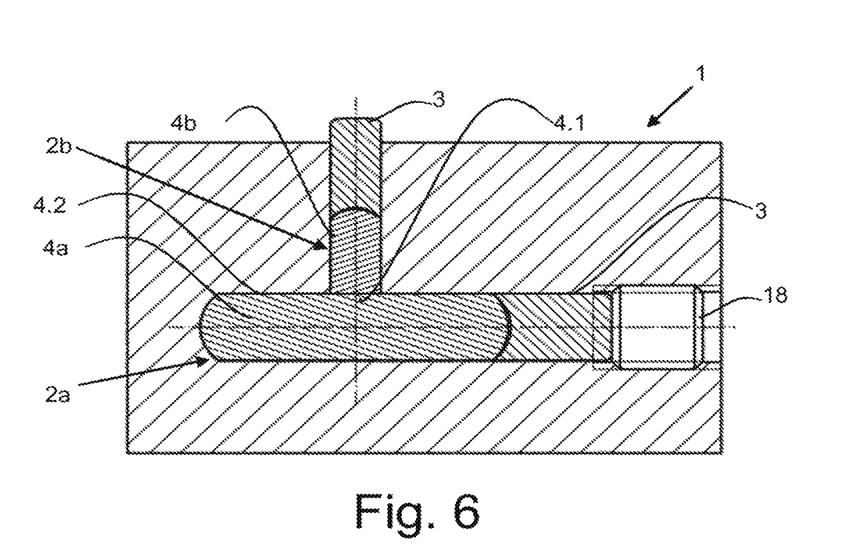
FIG. 6 is a sectional view of a third exemplary embodiment.

FIG. 6 shows a spring device 1 with a housing having two cavities 2a, 2b, in each of which a segment 4a, 4b of a two-piece solid body spring element 4 is arranged. An end face 4.1 of the one segment 4a acts on a lateral casing surface 4.2 of the other segment 4b. A piston 3 acts on each of the segments, either actively (directly) or passively (indirectly). In this way a function as a volume translator can be fulfilled. The solid body spring element 4 is configured multipiece, wherein the individual segments 4a, 4b are arranged unaligned with but at least approximately orthogonally to each other. By means of a stopper or closure plug 18, the position of a piston and hence the spring travel can be adjusted or the pretension force set in the installed state.

Figure 7:
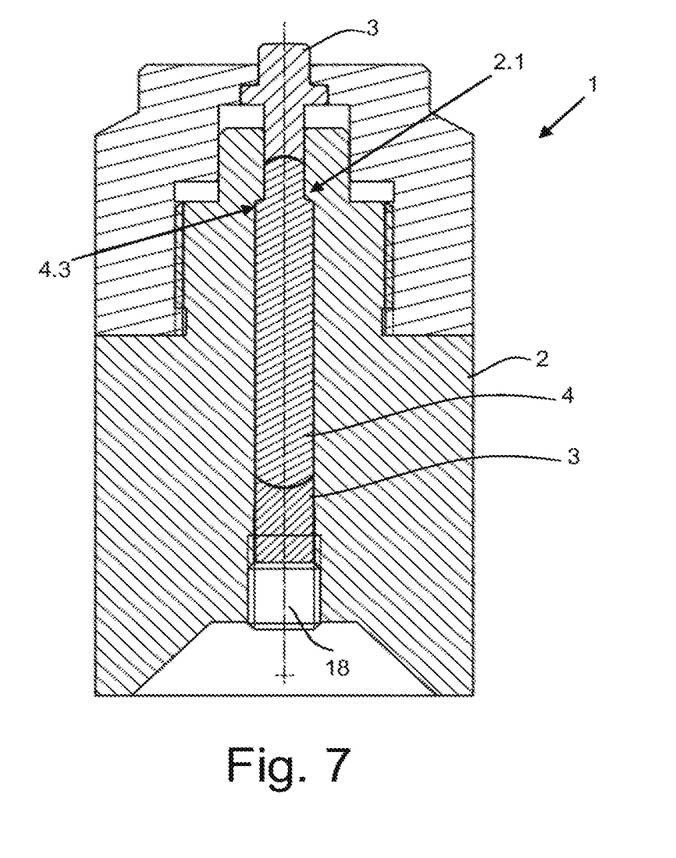
FIG. 7 is a sectional view of a third exemplary embodiment.

FIG. 7 shows a spring device 1 with a housing with a step or shoulder 2.1. The solid body spring element 4 has a geometrically corresponding step or shoulder 4.3, either by the arrangement in compression in the housing or by a predefined geometry. In this way, a function as a volume translator can be fulfilled.

Figure 8A:
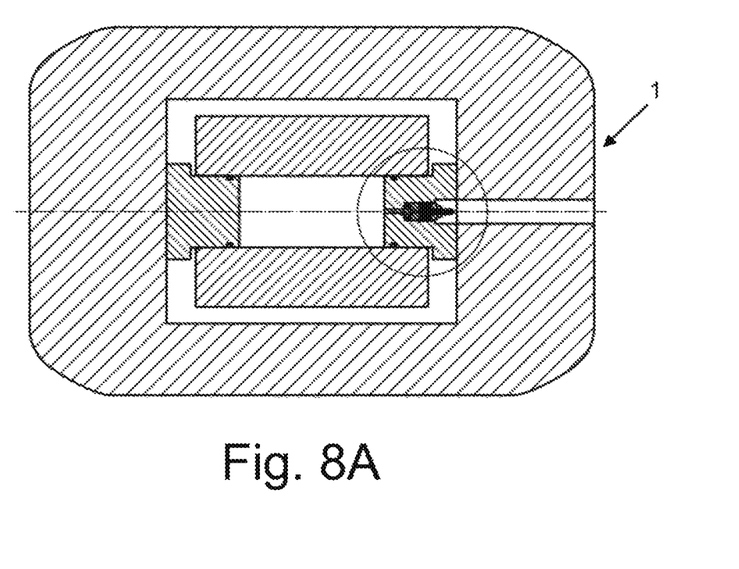
FIG. 8A is a detailed sectional view of a specific application according to exemplary embodiments.
Figure 8B:
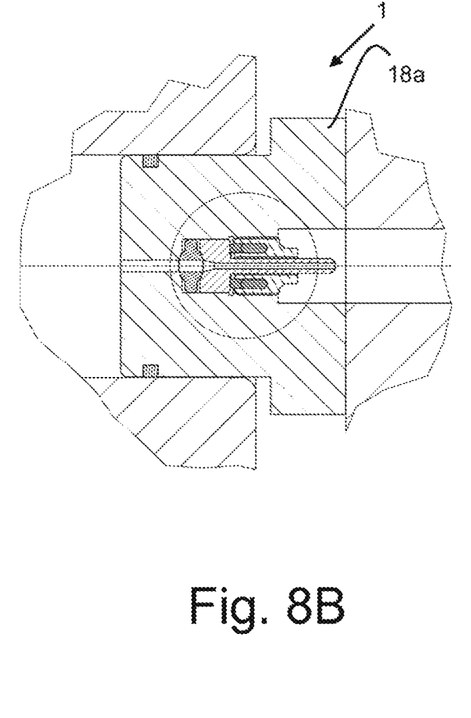
FIG. 8B is another detailed sectional view of a specific application according to exemplary embodiments.
Figure 8C:
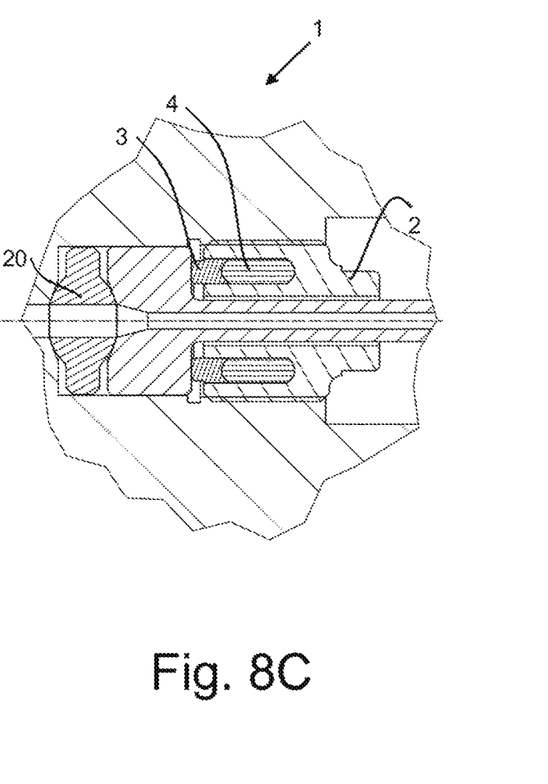
FIG. 8C is another detailed sectional view of a specific application according to exemplary embodiments.

FIGS. 8A, 8B, 8C show, in several views, also in detail, a specific application of a spring device 1 in a high-pressure container arrangement in connection with a sealing lense 20. The housing 2 is bolted to the machine element to be sealed. In this type of integration, extreme forces, which may occur on varying compression of the container closure plug 18a, can be converted into forces which are controllable in relation to the sealing and connection elements 20. FIG. 8B shows in detail the circled area of FIG. 8A, and FIG. 8C shows in detail the circled area of FIG. 8B.

What is claimed is:
1. A spring device comprising:
a piston;
a housing configured to movably receive the piston, the piston and the housing defining a cavity therebetween; and
a compressible solid body spring disposed in the cavity comprising a solid body that is configured to be compressed by the piston, wherein the solid body spring fills the cavity between the piston and the housing substantially completely or completely at least under an operating load;

wherein the piston includes a concave surface facing the solid body spring, the surface corresponding to a corresponding convex form of the solid body, wherein the piston and the concave surface of the piston are comprised of metal, wherein a movement of the piston reducing the cavity leads to a spreading of the piston, wherein a first surface of the spring body that is in contact with the housing forms an obtuse angle with a second surface of the spring body that adjoins the first surface and is in contact with the piston, with the obtuse angle being measured through an interior of the spring body.

2. The spring device of claim 1 wherein the solid body spring comprises a plastic or an elastomeric material.

3. The spring device of claim 1 wherein the solid body spring has a bulk modulus in the range from 100 MPa to 100,000 MPa.

4. The spring device of claim 1 wherein one or both of the piston and the solid body spring is arranged concentrically about a cylindrical passage hole in which a screw is disposed, wherein the screw extends completely through the solid body spring.

5. The spring device of claim 1 wherein one or both of: the piston lies or is brought to rest on an inside of the housing, and wherein the piston together with the housing forms an inner delimitation or inner casing surface of the cavity, which cavity is at least compressible by the piston.

6. The spring device of claim 1 wherein one or both of: the housing includes two end faces with the piston arranged on the two end faces; and wherein the piston has a pressure face for receiving and transmitting the forces to be transmitted to the solid body spring.

7. The spring device of claim 1 wherein the piston in an unloaded state overlaps the housing on at least one side of the housing and protrudes therefrom.

8. The spring device of claim 1 wherein the solid body spring has at least one conically convex end.

9. The spring device of claim 1 wherein the housing includes a shoulder and wherein the solid body spring is configured to rest or may be brought to rest against the shoulder, wherein the spring device is configured to change in volume by way of one or both of the shoulder provided in the housing and by way of several segments of the solid body spring which are arranged unaligned with but acting on each other.

10. The spring device of claim 1 wherein the modulus of elasticity of one or both of the housing and the piston is at least three times greater than the bulk modulus of the solid body spring.

11. A sealing system comprising a sealing lense and the spring device of claim 1.

12. The spring device of claim 1 wherein all surfaces of the piston facing the solid body spring element are concave, corresponding to a convex form of the solid body spring lying against the piston.

13. The spring device of claim 1 wherein all corners of the solid body spring that contact the housing are adjoined by surfaces of the sold body spring that form obtuse angles as measured through an interior of the spring body.

14. The spring device of claim 1 wherein the cavity is defined by at least one of:

concave surface portions of the piston and the housing, or flat surface portions of the piston and the housing, wherein transitions between the flat surface portions are either curved or form an angle of greater than 90°.

15. The spring device of claim 1 wherein the solid body spring is free of recesses, inclusions, fluid-filled cavities, foamed structures, and pores.

16. The spring device of claim 1 wherein an entirety of an interface between the piston and the housing is free of sealing rings.

17. The spring device of claim 1 wherein at each junction where the spring body, the housing, and the piston come together, two directly adjoining surfaces of the spring body form an obtuse angle relative to one another as measured across the interior of the spring body.

18. The spring device of claim 1 wherein the solid body spring is cylindrical and includes conically convex ends on opposite sides.

19. The spring device of claim 1 wherein a longitudinal axis of the piston is normal to a plane that extends through the solid body spring, wherein the solid body spring is symmetrical across the plane.

20. A spring device comprising:

a piston;

a housing configured to movably receive the piston, the piston and the housing defining a cavity therebetween; and a compressible solid body spring disposed in the cavity comprising a solid body that is configured to be compressed by the piston, wherein the solid body spring fills the cavity between the piston and the housing substantially completely or completely at least under an operating load;

wherein the piston includes a concave surface facing the solid body spring, the surface corresponding to a corresponding convex form of the solid body, wherein the piston and the concave surface of the piston are comprised of metal, wherein a movement of the piston reducing the cavity leads to a spreading of the piston, wherein the solid body spring is at least one of:

assembled from at least two coated segments each with a different bulk modulus; or formed from at least two segments which are arranged contacting each other in different action directions, wherein the cavity is one of several cavities between the piston and the housing, wherein each of the at least two segments is disposed in a separate one of the several cavities.

* * * * *